United States Patent
Sekine et al.

(10) Patent No.: US 10,261,733 B2
(45) Date of Patent: Apr. 16, 2019

(54) IMAGE FORMING APPARATUS, INFORMATION PROCESSING APPARATUS, AND NON-TRANSITORY COMPUTER READABLE MEDIUM FOR TRANSMITTING A PROGRAM TO AN IN-ROOM DEVICE

(71) Applicant: FUJI XEROX CO., LTD., Tokyo (JP)

(72) Inventors: Yoshihiro Sekine, Kanagawa (JP); Ryuichi Ishizuka, Tokyo (JP); Keita Sakakura, Kanagawa (JP); Takeshi Furuya, Kanagawa (JP); Hiroshi Mikuriya, Kanagawa (JP); Kenji Kuroishi, Kanagawa (JP); Eiji Nishi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/893,757

(22) Filed: Feb. 12, 2018

(65) Prior Publication Data
US 2018/0275927 A1 Sep. 27, 2018

(30) Foreign Application Priority Data
Mar. 24, 2017 (JP) ................................. 2017-058797

(51) Int. Cl.
G06F 3/12 (2006.01)
H04N 1/00 (2006.01)

(52) U.S. Cl.
CPC ............ *G06F 3/1225* (2013.01); *G06F 3/123* (2013.01); *G06F 3/129* (2013.01); *G06F 3/1229* (2013.01); *H04N 1/00127* (2013.01)

(58) Field of Classification Search
None
See application file for complete search history.

(56) References Cited

U.S. PATENT DOCUMENTS

| | | | |
|---|---|---|---|
| 9,430,723 B1 * | 8/2016 | Panda | G06F 3/12 |
| 2009/0213418 A1 * | 8/2009 | Kaneko | H04N 1/00344 358/1.15 |
| 2010/0245033 A1 * | 9/2010 | Sasakuma | G07C 9/00103 340/5.2 |
| 2010/0315670 A1 * | 12/2010 | Kojima | G06F 3/1204 358/1.15 |
| 2013/0227540 A1 * | 8/2013 | Ruster | G06F 8/65 717/170 |

(Continued)

FOREIGN PATENT DOCUMENTS

JP 2011-65586 A 3/2011

*Primary Examiner* — Miya J Williams
(74) *Attorney, Agent, or Firm* — Sughrue Mion, PLLC

(57) ABSTRACT

An image forming apparatus includes an image forming section that forms an image on a recording material; an acquiring section that acquires information from plural devices that are disposed in a room and acquire information on the room; a processing section that processes the information acquired by the acquiring section, and generates information that is used by an external device; a program acquiring section that acquires a program having an operation record in a partial device included in the plural devices disposed in the room; and a transmitting section that transmits the program acquired by the program acquiring section to another device included in the plural devices disposed in the room.

7 Claims, 9 Drawing Sheets

(56) References Cited

U.S. PATENT DOCUMENTS

| | | | |
|---|---|---|---|
| 2013/0314732 A1* | 11/2013 | Nakabayashi | G06F 3/1204 358/1.13 |
| 2015/0334262 A1* | 11/2015 | Tsuruoka | H04N 1/00973 358/1.13 |
| 2016/0036956 A1* | 2/2016 | Debates | H04M 1/72525 455/419 |
| 2018/0074767 A1* | 3/2018 | Ishizuka | G06F 3/1293 |

* cited by examiner

IMAGE FORMING APPARATUS, INFORMATION PROCESSING APPARATUS, AND NON-TRANSITORY COMPUTER READABLE MEDIUM FOR TRANSMITTING A PROGRAM TO AN IN-ROOM DEVICE

CROSS-REFERENCE TO RELATED APPLICATIONS

This application is based on and claims priority under 35 USC 119 from Japanese Patent Application No. 2017-058797 filed Mar. 24, 2017.

BACKGROUND

The present invention relates to an image forming apparatus and an information processing apparatus.

SUMMARY

According to an aspect of the present invention, there is provided an image forming section that forms an image on a recording material; an acquiring section that acquires information from plural devices that are disposed in a room and acquire information on the room; a processing section that processes the information acquired by the acquiring section, and generates information that is used by an external device; a program acquiring section that acquires a program having an operation record in a partial device included in the plural devices disposed in the room; and a transmitting section that transmits the program acquired by the program acquiring section to another device included in the plural devices disposed in the room.

BRIEF DESCRIPTION OF THE DRAWINGS

An exemplary embodiment of the present invention will be described in detail based on the following figures, wherein.

DETAILED DESCRIPTION

Figure 1:
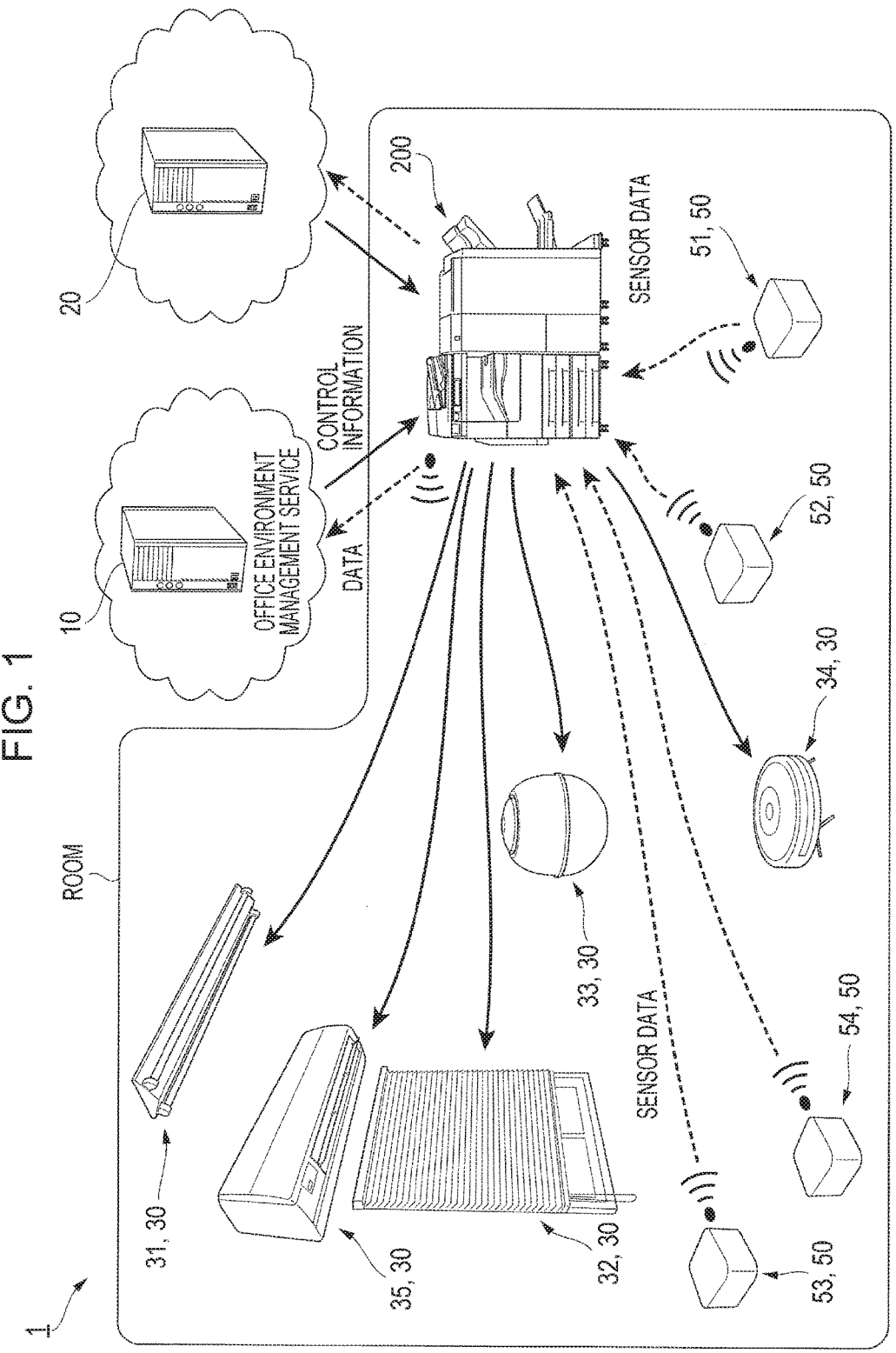
FIG. 1 illustrates a general configuration of an office environment management system.

An exemplary embodiment of the present invention is described below with reference to the accompanying drawings. FIG. 1 illustrates a general configuration of an office environment management system 1. The office environment management system 1 serving as an example of an information processing system is provided with a service providing server 10 serving as an example of an external device in a cloud. Referring to FIG. 1, while a single service providing server 10 is provided, plural service providing servers 10 are disposed by a number corresponding to the number of services to be provided in a room. In other words, in this exemplary embodiment, a case in which a service that manages the environment of an office is provided for a user in a room is exemplarily described. When an additional service is provided, an additional service providing server 10 corresponding to the additional service is arranged.

Moreover, the office environment management system 1 is provided with a firmware management server 20 in the cloud. The firmware management server 20 manages firmware (control program) that is used in a sensor 50 and an actuator 30 (hereinafter, occasionally referred to as "in-room device") disposed in the room.

Further, the office environment management system 1 according to this exemplary embodiment is provided with an image forming apparatus 200 in the room. The image forming apparatus 200 is connected with the service providing server 10 and the firmware management server 20, and functions as a gateway or an edge server.

The image forming apparatus 200 is also provided in each of other rooms different from the room illustrated in FIG. 1. The image forming apparatuses 200 other than the image forming apparatus 200 illustrated in FIG. 1 are also connected with the firmware management server 20.

Accordingly, the firmware management server 20 collects information about in-room devices under management of each of the plural image forming apparatuses 200.

The image forming apparatus 200 as an example of an information processing apparatus is disposed in a room (office) where a user works. The image forming apparatus 200 has a function of forming an image on a recording material such as paper, FAX function, and scanner function. The office environment management system 1 is further provided with a sensor 50 serving as an example of a device (in-room device), and an actuator 30.

The actuator 30 is connected with the service providing server 10 and the firmware management server 20 via the image forming apparatus 200 and a communication line such as an Internet line, and is controlled by the service providing server 10. The sensor 50 is connected with the service providing server 10 and the firmware management server 20 via the image forming apparatus 200 and a communication line such as an Internet line. Plural sensors 50 are disposed in the room and acquire various information on the room. Each sensor 50 outputs the acquired information to the image forming apparatus 200.

The image forming apparatus 200 outputs the information to the service providing server 10. The service providing server 10 controls the actuator 30 on the basis of the information transmitted from the image forming apparatus 200 (the information acquired by the sensor 50). The image forming apparatus 200 outputs information on an operating condition of the actuator 30 and an operating condition of the sensor 50 to the firmware management server 20.

The actuator 30 communicates with the image forming apparatus 200, and receives a control signal from the image forming apparatus 200 (a control signal transmitted from the service providing server 10 via the image forming apparatus 200). In this exemplary embodiment, an illumination device 31, a blind (window shade) device 32, a humidifier 33, a cleaner 34, and an air conditioner 35 are provided as examples of the actuator 30.

The illumination device 31 includes a light source, and turns on and off the light source in accordance with a control signal from the service providing server 10.

The blind device 32 has a blind (window shade) and a driving mechanism that changes the state of the blind, and changes the state of the blind in accordance with a control signal from the service providing server 10. Hence, the amount of external light which enters the room is changed.

The humidifier 33 has a mechanism that vaporizes water, and humidifies the room in accordance with a control signal from the service providing server 10. The cleaner 34 has a suction mechanism that sucks dust in the office, and moves in the room and collects the dust in the room in accordance with a control signal from the service providing server 10. The air conditioner 35 includes a heat source etc., and controls air conditioning in the office in accordance with a control signal from the service providing server 10.

Also, in this exemplary embodiment, a temperature sensor 51 that measures the temperature, a humidity sensor 52 that measures the humidity, an illuminance sensor 53 that measures the illuminance, and a human-presence sensor 54 that is, for example, an infrared sensor and detects presence of a human in the room are provided as examples of the sensor 50. Each sensor 50 transmits acquired information to the image forming apparatus 200 by using wireless communication or wired communication (by communicating with the image forming apparatus 200).

The image forming apparatus 200 transmits information (sensor data) from the sensor 50 to the service providing server 10 and the firmware management server 20. In the office environment management system 1, the service providing server 10 transmits control information that is used for controlling each actuator 30, to the image forming apparatus 200. The image forming apparatus 200 transmits the control information to the corresponding actuator 30.

In this exemplary embodiment, information on the firmware (control program) used in each in-room device and information on the model of the in-room device are transmitted from the in-room device to the image forming apparatus 200. The information is transmitted to the firmware management server 20 via the image forming apparatus 200.

Figure 2:
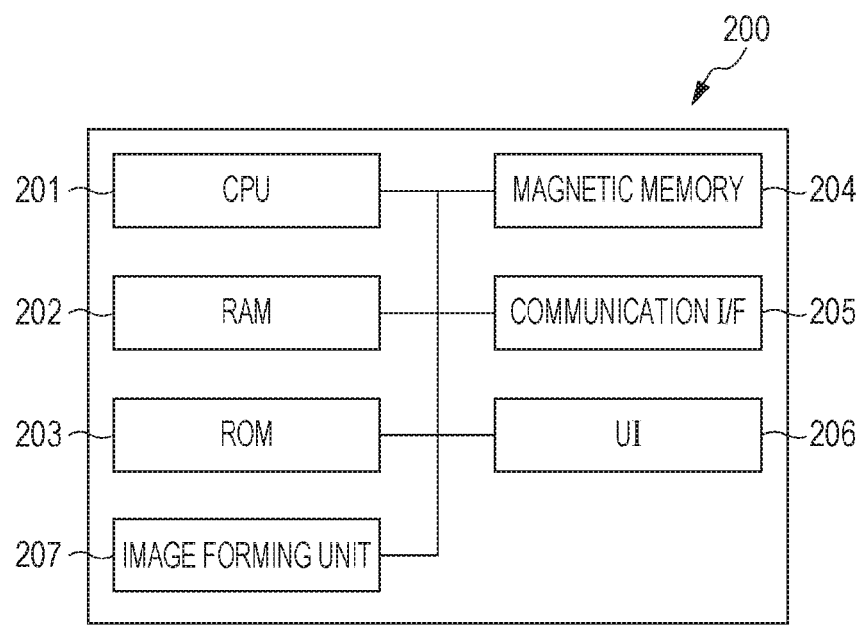
FIG. 2 illustrates a configuration of hardware of an image forming apparatus.

FIG. 2 illustrates a configuration of hardware of the image forming apparatus 200. As illustrated in FIG. 2, the image forming apparatus 200 includes a central processing unit (CPU) 201, a random access memory (RAM) 202, a read only memory (ROM) 203, and a magnetic memory 204. The image forming apparatus 200 also includes a communication interface (communication I/F) 205 for communication with an external device.

The image forming apparatus 200 further includes a user interface (UI) 206 and an image forming unit 207. The UI 206 is, for example, a touch-panel display, receives information to be displayed, and displays (makes notification about) this information to the user. The UI 206 receives an operation from the user. The image forming unit 207 serving as an example of an image forming section uses an electrophotographic system or an inkjet head system, and forms an image on paper, which is an example of a recording material.

The ROM 203 and the magnetic memory 204 store programs that are executed by the CPU 201. The CPU 201 reads a program stored in the ROM 203 or the magnetic memory 204, and executes the program while using the RAM 202 as a work area. The CPU 201 executes the programs stored in the ROM 203 and the magnetic memory 204, and hence respective functional units (described later) illustrated in FIG. 3 are implemented.

The program that is executed by the CPU 201 may be provided to the image forming apparatus 200, in a state in which the program is stored in a computer readable storage medium, such as a magnetic storage medium (magnetic tape, magnetic disk, etc.), an optical storage medium (optical disc, etc.), a magneto-optical storage medium, or a semiconductor memory. Alternatively, the program that is executed by the CPU 201 may be downloaded in the image forming apparatus 200 by using a communication measure such as the Internet.

Figure 3:
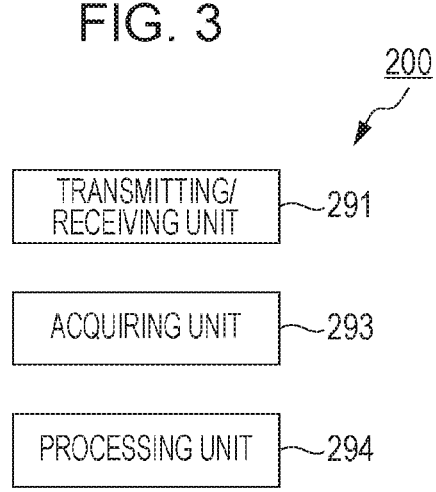
FIG. 3 illustrates respective functional units included in each image forming apparatus and implemented by a central processing unit (CPU) and other parts of the image forming apparatus.

FIG. 3 illustrates respective functional units included in each image forming apparatus 200 and implemented by the CPU 201 and other parts of the image forming apparatus 200. Each image forming apparatus 200 includes a transmitting/receiving unit 291 serving as an example of an acquiring section, a transmitting section, and a program acquiring section. The transmitting/receiving unit 291 uses the CPU 201 and the communication I/F 205 of each image forming apparatus 200, and transmits and receives information.

To be specific, for example, the transmitting/receiving unit 291 receives information from an in-room device. Also, the transmitting/receiving unit 291 transmits information to the in-room device. The transmitting/receiving unit 291 receives information from the service providing server 10 and the firmware management server 20, and transmits information to the service providing server 10 and the firmware management server 20. Also, the transmitting/receiving unit 291 receives and acquires firmware (control program) stored in an in-room device and transmitted from the in-room device, and receives and acquires firmware transmitted from the firmware management server 20. Further, the transmitting/receiving unit 291 transmits (provides) the acquired firmware to an in-room device in the room.

Each image forming apparatus 200 also includes an acquiring unit 293 as an example of an acquiring section. The acquiring unit 293 acquires sensor data that is information from a sensor 50 disposed in the room. Each image forming apparatus 200 further includes a processing unit 294 serving as an example of a processing section. The processing unit 294 performs predetermined processing (for example, previous processing such as noise reduction and/or event detection) on the sensor data acquired by the acquiring unit 293, and generates information that is used by the service providing server 10 as an example of an external device. In other words, the processing unit 294 processes the sensor data acquired by the acquiring unit 293, and generates information that is output to the service providing server 10.

In this exemplary embodiment, the sensor data processed by the processing unit 294 is transmitted to the service providing server 10. The service providing server 10 controls an actuator 30 disposed in the room, on the basis of the processed sensor data (performs control relating to management of the environment of an office).

Figure 4:
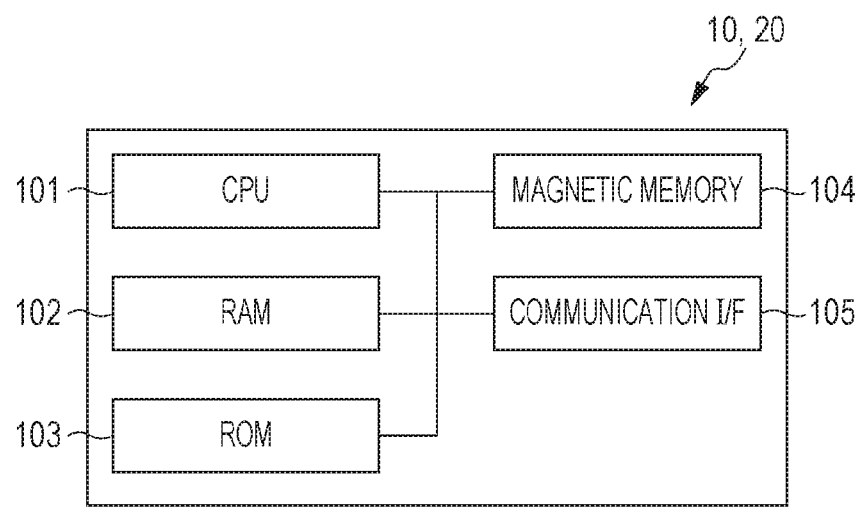
FIG. 4 illustrates a configuration of hardware of each of a service providing server and a firmware management server.

FIG. 4 illustrates a configuration of hardware of each of the service providing server 10 and the firmware management server 20. As illustrated in FIG. 4, the service providing server 10 and the firmware management server 20 each include a central processing unit (CPU) 101, a random access memory (RAM) 102, a read only memory (ROM) 103, and a magnetic memory 104. The service providing server 10 and the firmware management server 20 each also include a communication interface (communication I/F) 105 for communication with an external device. The CPU 101 executes the programs stored in the ROM 103 and the magnetic memory 104, and hence respective functional units illustrated in FIG. 5 are implemented in the firmware management server 20.

Figure 5:
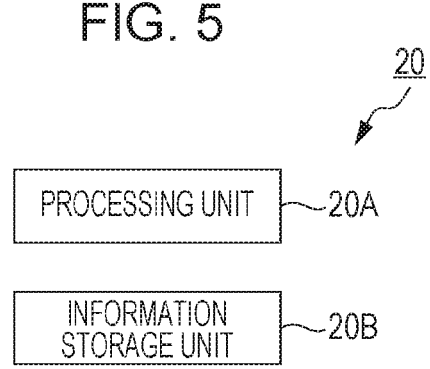
FIG. 5 is a functional block diagram illustrating functions of the firmware management server.

FIG. 5 is a functional block diagram illustrating functions of the firmware management server 20. As illustrated in FIG. 5, the firmware management server 20 includes a processing unit 20A and an information storage unit 20B. The processing unit 20A performs processing relating to firmware etc. stored in an in-room device. The information storage unit 20B is configured of the magnetic memory 104 (see FIG. 4) etc., and stores information relating to the firmware etc. In this exemplary embodiment, the information storage unit 20B stores information in a state in which the information is searchable from an external device.

In this exemplary embodiment, a database relating to an operation record of firmware is constructed in a cloud by using the firmware management server 20. Information on the model of an in-room device disposed in each room, the version of firmware stored in an in-room device disposed in each room, the operating time of an in-room device disposed in each room, and the service to be provided in each room is transmitted to the firmware management server 20 via an image forming apparatus 200 disposed in each of mutually different plural rooms. The information is stored in the information storage unit 20B of the firmware management server 20.

The processing unit 20A of the firmware management server 20 recognizes the operating time of each combination of firmware, and causes the information storage unit 20B to store the operating time. To be more specific, in this exemplary embodiment, plural in-room devices are disposed in a single room, and a service in a state in which plural pieces of firmware are combined is provided in the single room (a service is provided by a pair of pieces of firmware). The processing unit 20A handles the pair of pieces of firmware (hereinafter, referred to as "firmware pair") as a single unit, and recognizes the operating time of the firmware pair. The processing unit 20A stores the recognized operating time in the information storage unit 20B.

Further, the processing unit 20A of the firmware management server 20 specifies a firmware pair whose operating time exceeds a predetermined operating time from plural firmware pairs whose operating times are recognized by the processing unit 20A. In other words, the processing unit 20A specifies a firmware pair having an operation record from plural firmware pairs.

Further, the processing unit 20A of the firmware management server 20 specifies reliable firmware (having an operation record) for each model (type) of in-room device, and causes the information storage unit 20B to store information on the specified firmware. To be specific, the processing unit 20A specifies, for example, firmware whose operating time exceeds a predetermined operating time, as reliable firmware. The processing unit 20A also specifies, for example, firmware having operation records in more than a predetermined number (for example, 50) of in-room devices, as reliable firmware.

Further, the processing unit 20A of the firmware management server 20 specifies firmware that is not desirable for combination. To be specific, for each firmware pair, the processing unit 20A checks the state of the room (sensor data output from the sensor 50) when the firmware pair is used, and determines whether or not the firmware pair is proper.

The control of the room may be different from one originally intended depending on the combination of firmware. In this exemplary embodiment, the propriety of a firmware pair is determined for each firmware pair, and firmware that is not proper (not desirable) for combination is specified. An example of an improper firmware pair may be a firmware pair with a short operating time. In other words, an example of an improper firmware pair may be a firmware pair in which operation records of plural programs included in the firmware pair are shorter than a predetermined period.

Alternatively, the propriety of a firmware pair may be determined on the basis of information other than the sensor data and the operating time. For example, the propriety of a firmware pair may be determined on the basis of information transmitted to the firmware management server 20 from a vendor that provides firmware. To be more specific, the vendor may transmit information relating to combinations of firmware to the firmware management server 20, and the propriety of each firmware pair may be determined on the basis of the information.

If an in-room device is connected with an external device via an Internet line etc. like this exemplary embodiment, it is desirable to take a measure for security of the in-room device such as periodical update of firmware. The update of firmware takes time, and the firmware may not be occasionally updated.

If firmware is updated in a partial in-room device among plural in-room devices, a combination of firmware is changed. In some cases, a service different from a service originally intended may be provided due to the changed combination of firmware. It is difficult to secure operations of all combinations of firmware, and a service different from a service originally intended may be provided depending of the combination of firmware.

In this exemplary embodiment, as described above, the firmware management server 20 holds information relating to the propriety of a firmware pair for each of firmware pairs. Accordingly, for example, by referencing information on the propriety stored in the firmware management server 20 from each image forming apparatus 200, the image forming apparatus 200 is able to determine whether or not a firmware pair used in the corresponding room is proper.

Alternatively, the propriety of a firmware pair may be determined by the image forming apparatus 200. For example, information stored in the firmware management server 20 may be transmitted to the image forming apparatus 200, and the image forming apparatus 200 may determine the propriety of a firmware pair on the basis of the information. To be more specific, the image forming apparatus 200 may determine the propriety of a firmware pair by determining whether or not a combination of firmware included in the firmware pair satisfies a predetermined condition.

Also, in this exemplary embodiment, each image forming apparatus 200 references information of the firmware management server 20 at every predetermined timing.

Each image forming apparatus 200 determines whether or not each firmware of an in-room device disposed in the room is firmware having an operation record.

If the firmware management server 20 stores firmware with more operation records, each image forming apparatus 200 downloads the firmware from the firmware management server 20. The image forming apparatus 200 transmits the firmware to the corresponding in-room device (provides the firmware to the corresponding in-room device).

In other words, the image forming apparatus 200 provides firmware being the same as a firmware having an operation record in another room to an in-room device under management of the image forming apparatus 200. The firmware to be provided to the in-room device may be acquired from an in-room device disposed in the other room. Alternatively, firmware of the same version as the version of firmware stored in an in-room device disposed in the other room may be acquired from a vendor or the like. Still alternatively, firmware may be acquired from the firmware management server 20.

In this exemplary embodiment, since firmware of each in-room device is automatically updated, convenience of the user is increased as compared with a case where the update is performed with the operation by the user. Further, by performing the update, the security of in-room devices is increased. While the update is automatically performed in this exemplary embodiment, the update of firmware may be started when the user operates the UI 206 (see FIG. 2) etc. of the image forming apparatus 200. In other words, the update of firmware may be semi-automatically performed.

When each image forming apparatus 200 updates firmware, if the firmware pair after the update is the aforementioned improper firmware pair (firmware pair not desirable for combination), the image forming apparatus 200 does not update the firmware. In other words, when each image forming apparatus 200 updates firmware, the image forming apparatus 200 references information relating to the aforementioned propriety stored in the firmware management server 20. If the firmware pair after the update is the aforementioned improper firmware pair (if the firmware pair after the update satisfies a predetermined condition), the image forming apparatus 200 does not transmit the firmware to an in-room device under management of the image forming apparatus 200.

Alternatively, when each image forming apparatus 200 updates firmware, if the firmware pair after the update is the aforementioned improper firmware pair, the image forming apparatus 200 updates the firmware, but stops an in-room device that stores firmware being a factor of the improper firmware pair. In other words, the image forming apparatus 200 stops a partial in-room device included in plural in-room devices disposed in the room.

The in-room device may be stopped at a timing that is not limited to the timing of update. For example, the image forming apparatus 200 determines the propriety of a firmware pair (determines whether or not a combination of programs included in a firmware pair satisfies a predetermined condition) at every predetermined timing, and if the image forming apparatus 200 determines that the firmware pair is not proper, the image forming apparatus 200 may stop a partial in-room device.

Also, each image forming apparatus 200 may recognize the level of weakness of each in-room device under management of the image forming apparatus 200, and may determine whether or not the image forming apparatus 200 may continuously use each in-room device. For example, if a partial in-room device is an in-room device that is not able to take a countermeasure for weakness, such as a partial in-room device whose version is too old to be updated (an in-room device whose firmware is not able to be updated), the image forming apparatus 200 stops the partial in-room device.

Another processing example is described next. The description has been given for the example in which, for an in-room device in one room, firmware used in an in-room device having an operation record in another room is provided. The provision of firmware is not limited to the above-described example. For example, firmware having an operation record in one in-room device included in plural in-room devices disposed in one room may be provided for another in-room device in the one room.

To be more specific, for example, an image forming apparatus 200 acquires firmware from a partial in-room device included in plural in-room devices under management of the image forming apparatus 200, and provides the acquired firmware to another in-room device under management of the image forming apparatus 200. Alternatively, for example, the firmware management server 20 acquires firmware via an image forming apparatus 200 from a partial in-room device under management of the image forming apparatus 200, and provides the acquired firmware to another in-room device under management of the image forming apparatus 200.

To be more specific, for example, an image forming apparatus 200 references information stored in the firmware management server 20, and recognizes an in-room device having an operation record exceeding a predetermined period among plural in-room devices under management of the image forming apparatus 200. For example, the image forming apparatus 200 acquires firmware used in the in-room device from the in-room device, and transmits the acquired firmware to another in-room device of the same model under management of the image forming apparatus 200.

To be more specific, this example assumes that plural in-room devices of the same model (the same type) are disposed under management of the image forming apparatus 200. In this case, an in-room device having firmware with the most operation records among the plural in-room devices is specified. Then, the firmware with the most operation records is provided to an in-room device that stores firmware in a version older than the version of the firmware with the most operation records. Accordingly, in this example, firmware with an operation record is provided to each of in-room devices of the same type in one room, and the reliability of system is increased. In this example, the firmware is directly acquired from an in-room device actually disposed in a room. However, firmware may be acquired from the firmware management server 20 or a vendor.

As described above, if firmware having an operation record in one in-room device in a room is provided to another in-room device in the room, a service to be provided in the room (control relating to the room) may be more suitable for the room as compared with a case where firmware with an operation record in an in-room device in a room different from the room is provided.

While the case where firmware with an operation record is provided for an in-room device already disposed in a room has been described above, even in a case where a new in-room device is additionally disposed or a case where an existing in-room device is replaced with a new in-room device, a program having an operation record may be provided for such an in-room device by the same method as the one described above.

Figure 6:
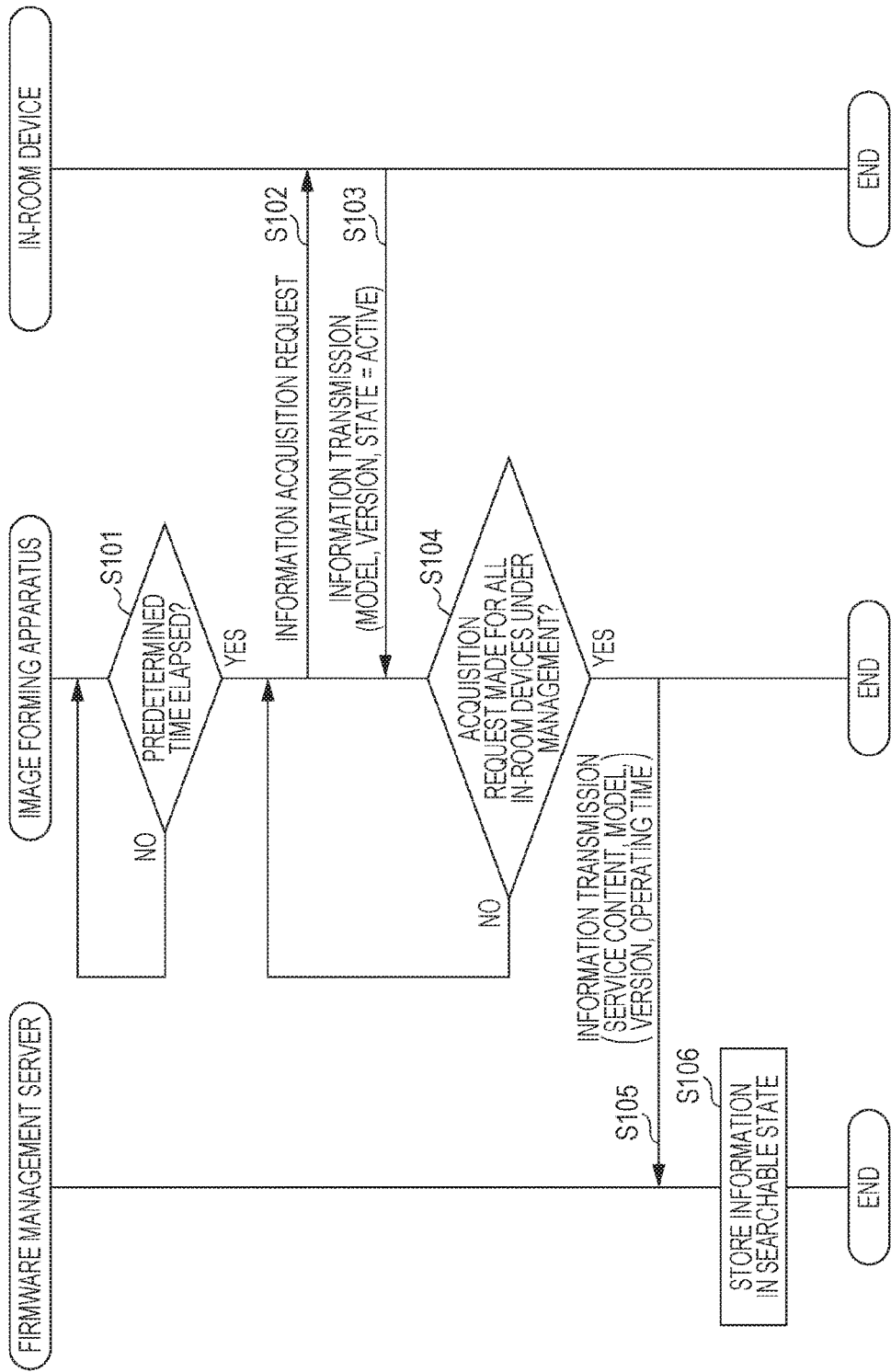
FIG. 6 illustrates a flow of processing when operating information etc. of an in-room device is transmitted to the firmware management server.

FIGS. 6 to 11 each illustrate an example flow of processing of the environment management system 1. FIG. 6 illustrates a flow of processing when operating information etc. of an in-room device is transmitted to the firmware management server 20. In this exemplary embodiment, the image forming apparatus 200 determines whether or not a predetermined time has elapsed with reference to a predetermined reference time (step 101). If the predetermined time has elapsed, the image forming apparatus 200 makes an information acquisition request to each of in-room devices (step 102). In other words, the image forming apparatus 200 makes the information acquisition request to each of in-room devices every time when the predetermined time elapses.

In response to the acquisition request, each in-room device transmits information on the in-room device to the image forming apparatus 200 (step 103). To be specific, for example, information, such as the model of an in-room device, the version of firmware stored in the in-room device, the operating time of the in-room device (firmware), the state of the in-room device (the state indicative of whether being active or not), and the service provided in the room, is transmitted from each in-room device to the image forming apparatus 200.

Then, the image forming apparatus 200 determines whether or not the image forming apparatus 200 has made the information acquisition request to all in-room devices under management of the image forming apparatus 200 (step 104), and if it is determined that the image forming apparatus 200 made the acquisition request to all devices, the image forming apparatus 200 transmits the information acquired by the processing in step 102 and step 103 to the firmware management server 20 (step 105).

To be specific, the image forming apparatus 200 transmits the content of the service provided in the room, the model of the in-room device, the version of firmware stored in the in-room device, the operating time of the in-room device (firmware), the state of the in-room device, etc., to the firmware management server 20. In this exemplary embodiment, these pieces of information are stored in the firmware management server 20 in a searchable state from an external device (step 106).

Figure 7:
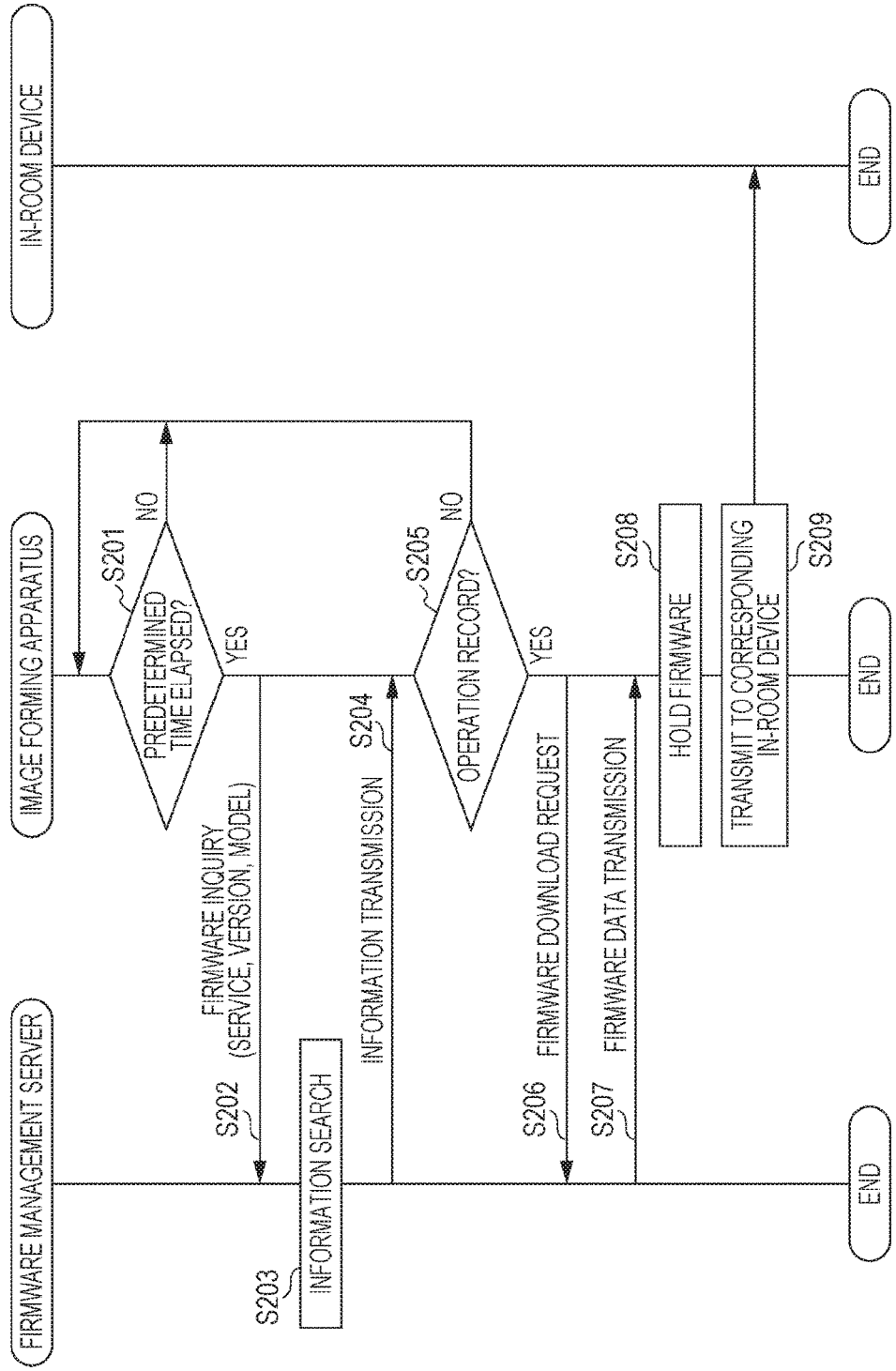
FIG. 7 illustrates a flow of processing relating to specification of firmware to be updated.

FIG. 7 illustrates a flow of processing relating to specification of firmware to be updated. In this processing, the image forming apparatus 200 determines whether or not a predetermined time has elapsed (step 201), and if the predetermined time has elapsed, the image forming apparatus 200 makes an inquiry about firmware to the firmware management server 20 (step 202). At the time of making the inquiry, the image forming apparatus 200 transmits information on a service provided in the room, the version of firmware stored in an in-room device disposed in the room, and the model of the in-room device disposed in the room to the firmware management server 20.

Then, the firmware management server 20 searches information (step 203), and extracts firmware whose model corresponds to the transmitted model and whose version is newer than the transmitted version. The firmware management server 20 transmits information on the extracted firmware (information including the operating time of the firmware) to the image forming apparatus 200 (step 204).

The image forming apparatus 200 determines whether or not the firmware extracted by the firmware management server 20 has an operation record on the basis of the information (information relating to the operating time) transmitted from the firmware management server 20 (step 205). If the image forming apparatus 200 determines that the operation record is present, the image forming apparatus 200 makes a firmware download request for the firmware to the firmware management server 20 (step 206). In response to this, the firmware management server 20 transmits the extracted firmware to the image forming apparatus 200 (step 207). Then, the image forming apparatus 200 receives and temporarily holds the firmware (step 208). Then, the image forming apparatus 200 transmits (provides) the firmware to a corresponding in-room device (step 209). In other words, the image forming apparatus 200 transmits the firmware to an in-room device that stores firmware in a version older than the version of the firmware to be provided.

Figure 8:
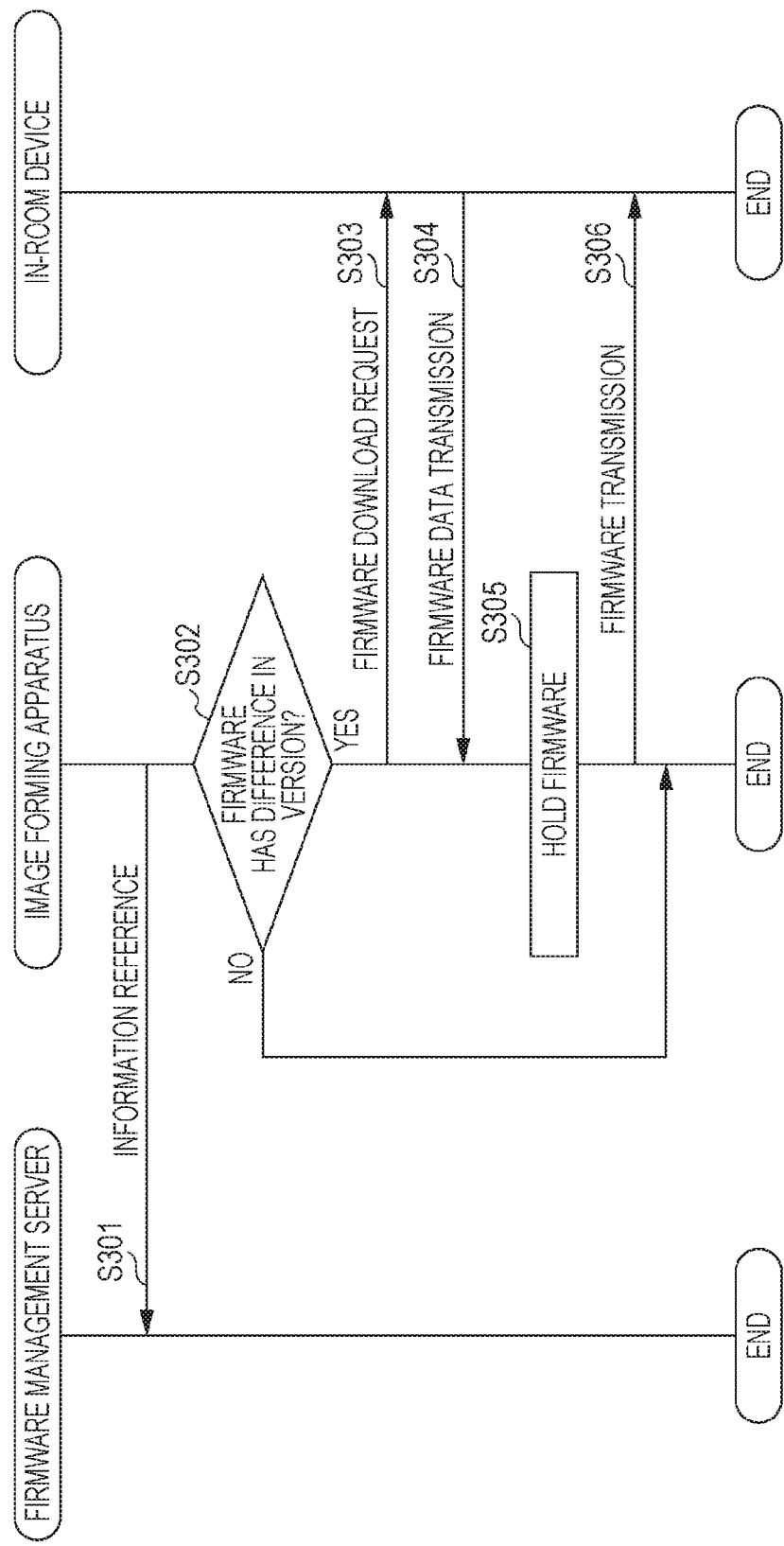
FIG. 8 illustrates a flow of processing when firmware is acquired from an in-room device disposed in a room.

FIG. 8 illustrates a flow of processing when firmware is acquired from an in-room device disposed in a room. In this processing, the image forming apparatus 200 references information stored in the firmware management server 20 (step 301), recognizes the operation record (operation period) for each of plural in-room devices of the same model under management of the image forming apparatus 200, and recognizes the version of firmware stored in the in-room device.

The image forming apparatus 200 determines whether or not there is a difference in version of firmware stored in the respective in-room devices of the same type (step 302), and if there is a difference in version, the image forming apparatus 200 recognizes the operation record of an in-room device that stores firmware in the latest version (recognizes the operation record of firmware in the latest version).

If the recognized operation record is an operation record exceeding a predetermined period, the image forming apparatus 200 makes a firmware download request to the in-room device having the operation record (step 303). In response to this, the in-room device transmits the firmware stored therein to the image forming apparatus 200 (step 304). The image forming apparatus 200 temporarily holds the firmware (step 305), and transmits the firmware to an in-room device that stores firmware in an old version (step 306).

Figure 9:
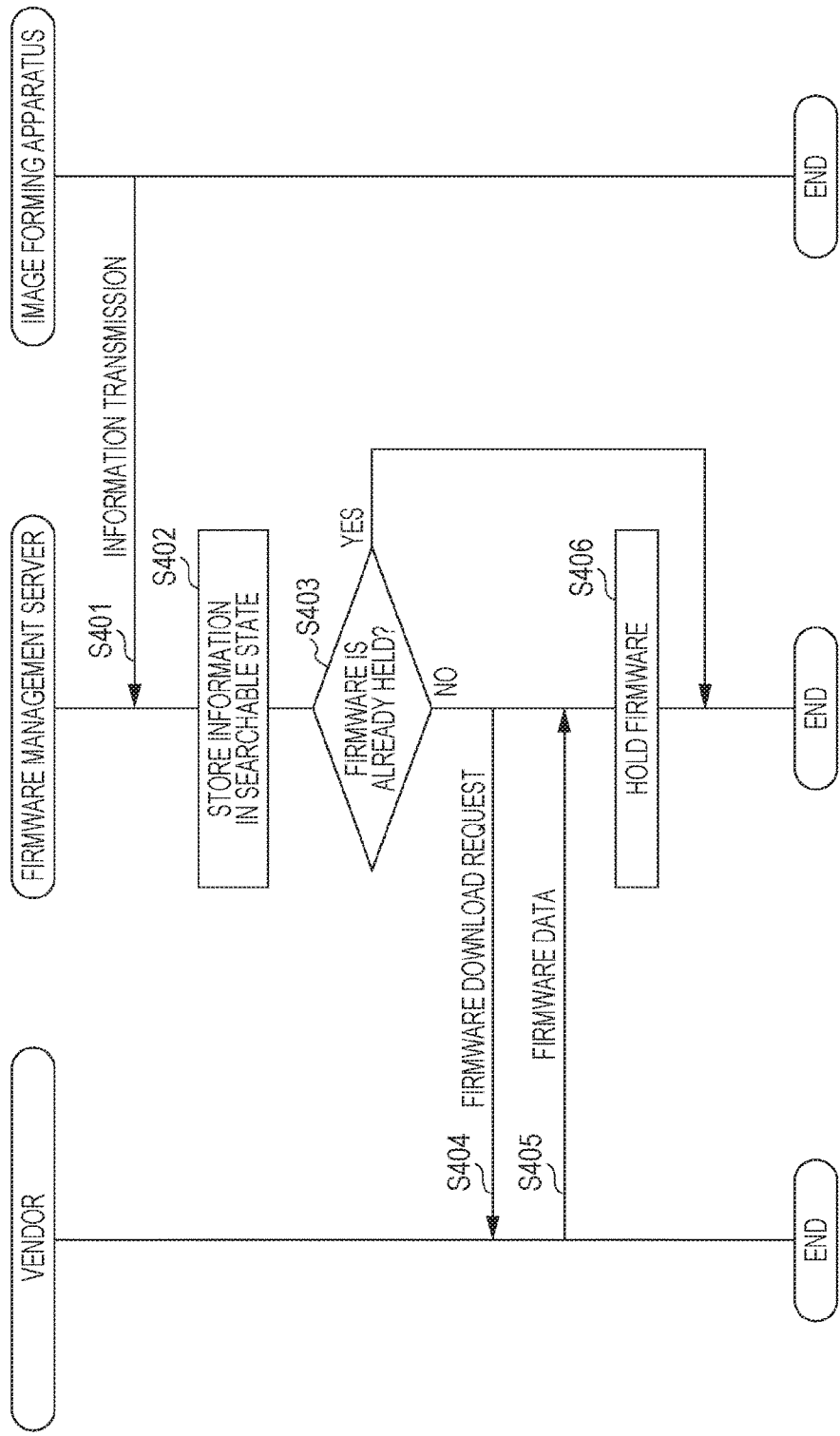
FIG. 9 illustrates another processing example relating to collection of firmware.

FIG. 9 illustrates another processing example relating to collection of firmware. In this processing example, each image forming apparatus 200 transmits information on an in-room device to the firmware management server 20 (step 401). The firmware management server 20 stores the information in a searchable manner (step 402).

Then, the firmware management server 20 determines, on the basis of the information on the acquired in-room device, whether or not the firmware management server 20 already holds firmware corresponding to the in-room device (step 403). If the firmware management server 20 does not hold the firmware, the firmware management server 20 makes a firmware download request to a vendor (step 404).

In response to this, the vendor transmits the firmware to the firmware management server 20 (step 405). Then, the firmware management server 20 holds the firmware (step 406). The acquisition source of the firmware to be stored in the firmware management server 20 may be the vendor as described above. Alternatively, the acquisition source may be an in-room device actually disposed in the room.

Figure 10:
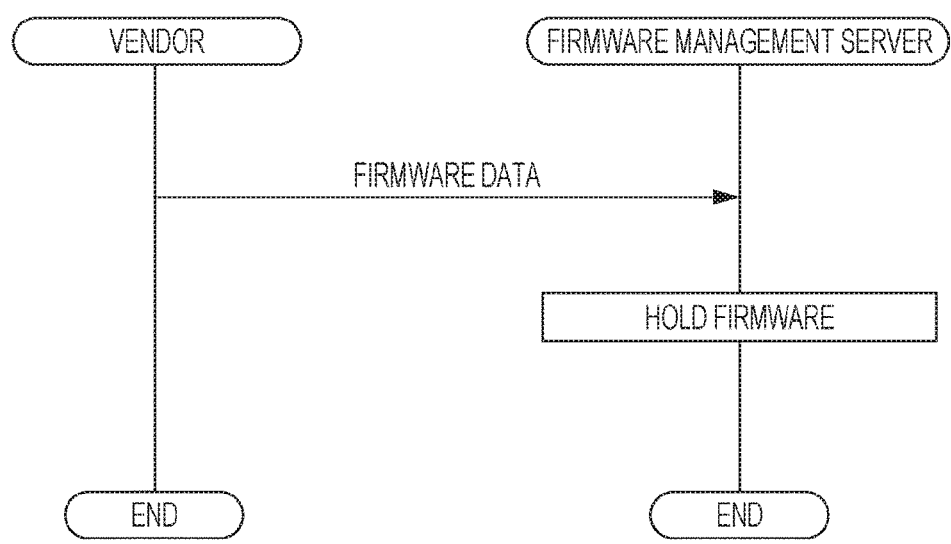
FIG. 10 illustrates still another processing example relating to collection of firmware.

FIG. 10 illustrates still another processing example relating to collection of firmware. While the firmware is transmitted from the vendor to the firmware management server 20 in response to the firmware download request in the example illustrated in FIG. 9, the firmware may be transmitted from the vendor to the firmware management server 20 without the download request as illustrated in FIG. 10. The example in FIG. 10 illustrates a case where firmware is transmitted from the vendor to the firmware management server 20 every time when new firmware is generated by the vendor.

Figure 11:
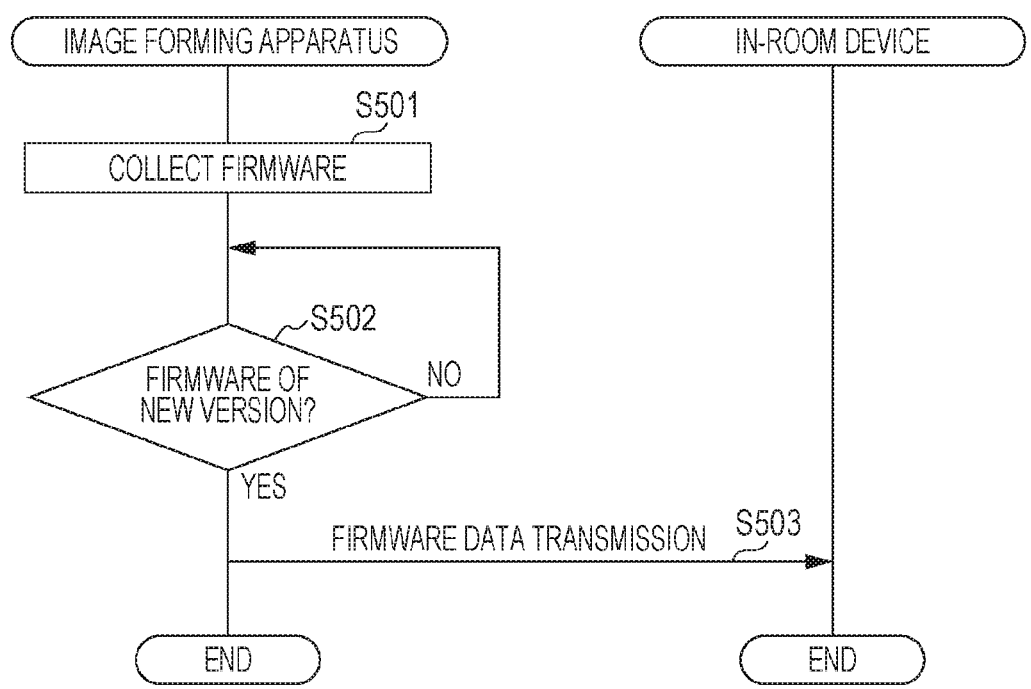
FIG. 11 illustrates yet another processing example relating to collection of firmware.

FIG. 11 illustrates yet another processing example relating to collection of firmware. While the firmware management server 20 collects firmware in the above description, the image forming apparatus 200 disposed in each room may collect firmware. In the example illustrated in FIG. 11, the image forming apparatus 200 collects firmware (step 501), and determines whether or not the image forming apparatus 200 has firmware in a version newer than the version of firmware that is stored in an in-room device under management of the image forming apparatus 200 (step 502).

If the image forming apparatus 200 determines as having new firmware, the image forming apparatus 200 determines whether or not the firmware has an operation record similarly to the above-described example. If the firmware has an operation record, the image forming apparatus 200 transmits the new firmware to an in-room device that is a corresponding in-room device and that stores firmware in a version older than the version of the new firmware (step 503).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
an image forming section configured to form an image on a recording material; and
a hardware processor configured to implement:
an acquiring section that acquires information from a device that is disposed in a room and acquires information on the room;
a processing section that processes the information acquired by the acquiring section, and generates information that is used by an external device;
a program acquiring section that acquires a program having an operation record in another device other than the device disposed in the room; and
a transmitting section that transmits the program acquired by the program acquiring section to the device disposed in the room,
wherein, if a combination of a program to be transmitted to an in-room device, which is the device disposed in the room, and a program stored in another device disposed in the room satisfies a predetermined condition, then the transmitting section does not transmit the program to the in-room device.

2. The image forming apparatus according to claim 1,
wherein the program acquiring section acquires a program that has an operation record in the another device and the operation record exceeds a predetermined period.

3. The image forming apparatus according to claim 1,
wherein the program acquiring section acquires a program having an operation record in another device disposed in a room that is different from the room.

4. The image forming apparatus according to claim 1,
wherein the transmitting section transmits the program having the operation record in the another device to a device that stores a program in a version older than a version of the program having the operation record in the another device.

5. The image forming apparatus according to claim 1,
wherein if operation records of a plurality of programs included in the combination are shorter than a predetermined period, the transmitting section does not transmit the program to the in-room device.

6. An information processing apparatus, comprising:
a hardware processor configured to implement:
an acquiring section that acquires information from a device that is disposed in a room and acquires information on the room;
a processing section that processes the information acquired by the acquiring section, and generates information that is used by an external device;
a program acquiring section that acquires a program having an operation record in another device other than the device disposed in the room; and
a transmitting section that transmits the program acquired by the program acquiring section to the device disposed in the room,
wherein, if a combination of a program to be transmitted to an in-room device, which is the device disposed in the room, and a program stored in another device disposed in the room satisfies a predetermined condition, then the transmitting section does not transmit the program to the in-room device.

7. A non-transitory computer readable storage medium storing instructions for causing a computer to execute:
an acquiring section that acquires information from a device that is disposed in a room and acquires information on the room;
a processing section that processes the information acquired by the acquiring section, and generates information that is used by an external device;
a program acquiring section that acquires a program having an operation record in another device other than the device disposed in the room; and
a transmitting section that transmits the program acquired by the program acquiring section to the device disposed in the room,
wherein, if a combination of a program to be transmitted to an in-room device, which is the device disposed in the room, and a program stored in another device disposed in the room satisfies a predetermined condition, then the transmitting section does not transmit the program to the in-room device.

* * * * *